US008614622B2

(12) United States Patent
Van Wiemeersch et al.

(10) Patent No.: US 8,614,622 B2
(45) Date of Patent: *Dec. 24, 2013

(54) METHOD AND SYSTEM FOR ENABLING AN AUTHORIZED VEHICLE DRIVEAWAY

(75) Inventors: John Robert Van Wiemeersch, Novi, MI (US); Robert Bruce Kleve, Farmington, MI (US); Kevin Thomas Hille, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 268 days.

This patent is subject to a terminal disclaimer.

(21) Appl. No.: 12/719,047

(22) Filed: Mar. 8, 2010

(65) Prior Publication Data

US 2011/0215901 A1 Sep. 8, 2011

(51) Int. Cl.
G06F 7/04 (2006.01)
(52) U.S. Cl.
USPC .................. 340/5.54; 340/5.72; 340/5.64
(58) Field of Classification Search
USPC ......... 340/539.19, 5.72, 5.61, 455, 426.3, 84, 340/5.6, 5.54; 455/41.2
See application file for complete search history.

(56) References Cited

U.S. PATENT DOCUMENTS

| | | |
|---|---|---|
| 4,804,937 A | 2/1989 | Barbiaux et al. |
| 5,355,511 A | 10/1994 | Hatano et al. |
| 5,432,841 A | 7/1995 | Rimer |
| 5,633,484 A | 5/1997 | Zancho et al. |
| 5,654,686 A | 8/1997 | Geschke et al. |
| 5,732,074 A | 3/1998 | Spaur et al. |
| 5,758,300 A | 5/1998 | Abe |
| 5,889,468 A | 3/1999 | Banga |
| 5,942,979 A | 8/1999 | Luppino |
| 5,943,206 A | 8/1999 | Crayford |
| 5,963,129 A | 10/1999 | Warner |
| 5,986,543 A | 11/1999 | Johnson |

(Continued)

FOREIGN PATENT DOCUMENTS

| | | |
|---|---|---|
| DE | 10141439 | 2/2003 |
| DE | 10225787 A1 | 12/2003 |
| JP | 2005220635 | 8/2005 |

OTHER PUBLICATIONS

Acumine PTY LTD—Fleet Monitoring System, http://www.acumine.com/_Products/Fleet Monitoring.php., May 22, 2009.

(Continued)

*Primary Examiner* — Steven Lim
*Assistant Examiner* — Kaleria Knox
(74) *Attorney, Agent, or Firm* — Jennifer Stec; Brooks Kushman P.C.

(57) ABSTRACT

Various embodiments may include methods and system for enabling an authorized vehicle driveaway. A vehicle driveaway authorization code for authorizing a vehicle to be driven and a user authorization code that corresponds to the vehicle driveaway authorization code may be generated. The codes may be generated by, for example, at least one server configured to generate the authorization codes. The at least one server may be communicating with a nomadic device and a vehicle driveaway authorization system. A vehicle driveaway request signal may be received. In response to a receipt of the vehicle driveaway request signal, the vehicle driveaway authorization code may be transmitted to the vehicle driveaway authorization system and the user authorization code may be transmitted to the nomadic device for input to the vehicle driveaway authorization system in order to enable the vehicle to be driven.

2 Claims, 6 Drawing Sheets

(56) References Cited

U.S. PATENT DOCUMENTS

| | | | |
|---|---|---|---|
| 5,993,397 | A | 11/1999 | Branson |
| 6,025,777 | A | 2/2000 | Fuller et al. |
| 6,037,676 | A | 3/2000 | Foree |
| 6,067,009 | A | 5/2000 | Hozuka et al. |
| 6,104,931 | A | 8/2000 | Havinis et al. |
| 6,292,095 | B1 | 9/2001 | Fuller et al. |
| 6,295,449 | B1 | 9/2001 | Westerlage et al. |
| 6,339,736 | B1 | 1/2002 | Moskowitz et al. |
| 6,343,220 | B1 | 1/2002 | Van Der Salm |
| 6,370,472 | B1 | 4/2002 | Fosseen |
| 6,415,210 | B2 | 7/2002 | Hozuka et al. |
| 6,429,773 | B1 | 8/2002 | Schuyler |
| 6,435,018 | B1 | 8/2002 | Murakami et al. |
| 6,441,732 | B1 | 8/2002 | Laitsaari et al. |
| 6,470,732 | B1 | 10/2002 | Breton |
| 6,487,478 | B1 | 11/2002 | Azzaro et al. |
| 6,525,643 | B1 | 2/2003 | Okada et al. |
| 6,571,617 | B2 | 6/2003 | Van Niekerk et al. |
| 6,587,040 | B2 | 7/2003 | Seto |
| 6,611,740 | B2 | 8/2003 | Lowrey et al. |
| 6,612,165 | B2 | 9/2003 | Juzswik et al. |
| 6,629,031 | B2 | 9/2003 | Gustavsson et al. |
| 6,671,609 | B2 | 12/2003 | Nantz et al. |
| 6,691,025 | B2 | 2/2004 | Reimer |
| 6,732,031 | B1 | 5/2004 | Lightner et al. |
| 6,738,697 | B2 | 5/2004 | Breed |
| 6,825,758 | B1 | 11/2004 | Laitsaari |
| 6,836,708 | B2 | 12/2004 | Tripathi |
| 6,839,614 | B1 | 1/2005 | Timko et al. |
| 6,845,314 | B2 | 1/2005 | Fosseen |
| 6,847,872 | B2 | 1/2005 | Bodin et al. |
| 6,853,853 | B1 | 2/2005 | Van Wiemeersch et al. |
| 6,892,052 | B2 * | 5/2005 | Kotola et al. ............... 455/41.2 |
| 6,930,614 | B2 | 8/2005 | Rackham et al. |
| 6,937,141 | B2 | 8/2005 | Muramatsu |
| 6,983,200 | B2 | 1/2006 | Bodin et al. |
| 6,993,421 | B2 | 1/2006 | Pillar et al. |
| 7,053,761 | B2 | 5/2006 | Schofield et al. |
| 7,068,158 | B2 | 6/2006 | Komatsu et al. |
| 7,092,804 | B2 | 8/2006 | McQuade et al. |
| 7,096,101 | B2 | 8/2006 | Sonnenrein et al. |
| 7,114,379 | B2 | 10/2006 | Emord |
| 7,170,400 | B2 | 1/2007 | Cowelchuk et al. |
| 7,171,188 | B1 | 1/2007 | Watanabe et al. |
| 7,216,532 | B2 | 5/2007 | Rimkus et al. |
| 7,218,209 | B2 | 5/2007 | Utter et al. |
| 7,219,063 | B2 | 5/2007 | Schalk et al. |
| 7,224,262 | B2 | 5/2007 | Simon et al. |
| 7,228,122 | B2 | 6/2007 | Oyagi et al. |
| 7,319,378 | B1 | 1/2008 | Thompson et al. |
| 7,379,541 | B2 | 5/2008 | Iggulden et al. |
| 7,394,352 | B2 | 7/2008 | Bell et al. |
| 7,509,849 | B2 | 3/2009 | Rutherford et al. |
| 7,778,186 | B2 * | 8/2010 | Oman et al. ............... 340/5.61 |
| 7,783,246 | B2 | 8/2010 | Twitchell, Jr. et al. |
| 7,849,149 | B2 | 12/2010 | Habaguchi et al. |
| 7,859,392 | B2 | 12/2010 | McClellan et al. |
| 8,061,879 | B2 | 11/2011 | Simmons et al. |
| 8,089,348 | B2 | 1/2012 | Kameyama |
| 8,120,475 | B2 | 2/2012 | Iwamoto et al. |
| 8,325,028 | B2 | 12/2012 | Schofield et al. |
| 2001/0033225 | A1 | 10/2001 | Razavi et al. |
| 2002/0130771 | A1 | 9/2002 | Osbourne et al. |
| 2003/0004741 | A1 | 1/2003 | Johnson et al. |
| 2003/0016130 | A1 | 1/2003 | Joao |
| 2003/0093218 | A1 | 5/2003 | Jones |
| 2003/0158640 | A1 | 8/2003 | Pillar et al. |
| 2003/0205081 | A1 | 11/2003 | Proschka |
| 2003/0208309 | A1 | 11/2003 | Triphathi |
| 2004/0050188 | A1 | 3/2004 | Richards et al. |
| 2004/0075539 | A1 | 4/2004 | Savoie et al. |
| 2004/0112124 | A1 | 6/2004 | Sonnenrein et al. |
| 2004/0193368 | A1 | 9/2004 | Sanqunetti |
| 2004/0203634 | A1 | 10/2004 | Wang et al. |
| 2005/0024189 | A1 | 2/2005 | Weber |
| 2005/0137763 | A1 | 6/2005 | Watkins et al. |
| 2005/0179518 | A1 | 8/2005 | Kawamura et al. |
| 2005/0190900 | A1 | 9/2005 | White et al. |
| 2005/0195106 | A1 | 9/2005 | Davis et al. |
| 2005/0273218 | A1 | 12/2005 | Breed et al. |
| 2006/0095174 | A1 | 5/2006 | Sonnenrein et al. |
| 2006/0208865 | A1 | 9/2006 | Quach et al. |
| 2006/0220806 | A1 | 10/2006 | Nguyen |
| 2006/0220809 | A1 | 10/2006 | Stigall et al. |
| 2006/0220813 | A1 | 10/2006 | Utter et al. |
| 2006/0235652 | A1 | 10/2006 | Rimkus et al. |
| 2006/0273885 | A1 | 12/2006 | Thompson |
| 2006/0288101 | A1 | 12/2006 | Mastrodonato et al. |
| 2007/0015548 | A1 | 1/2007 | Flick |
| 2007/0060056 | A1 | 3/2007 | Whitaker et al. |
| 2007/0155300 | A1 | 7/2007 | Hsieh |
| 2007/0156317 | A1 | 7/2007 | Breed |
| 2007/0193348 | A1 | 8/2007 | Rutherford et al. |
| 2007/0200671 | A1 * | 8/2007 | Kelley et al. ............... 340/5.72 |
| 2007/0229350 | A1 | 10/2007 | Scalisi et al. |
| 2007/0290881 | A1 | 12/2007 | Nikitin et al. |
| 2008/0046149 | A1 | 2/2008 | Breed |
| 2008/0077292 | A1 | 3/2008 | Gisler |
| 2008/0082221 | A1 | 4/2008 | Nagy |
| 2008/0106859 | A1 | 5/2008 | Eguchi et al. |
| 2008/0125665 | A1 | 5/2008 | Nigam |
| 2008/0136611 | A1 * | 6/2008 | Benco et al. ............... 340/426.3 |
| 2008/0140265 | A1 | 6/2008 | Hong et al. |
| 2008/0147265 | A1 | 6/2008 | Breed |
| 2008/0147271 | A1 | 6/2008 | Breed |
| 2008/0172147 | A1 | 7/2008 | Taki et al. |
| 2008/0197970 | A1 | 8/2008 | Fouts |
| 2008/0204556 | A1 | 8/2008 | de Miranda et al. |
| 2008/0215665 | A1 | 9/2008 | Appleby et al. |
| 2008/0228355 | A1 | 9/2008 | de Jonk et al. |
| 2008/0266051 | A1 | 10/2008 | Taki et al. |
| 2008/0299961 | A1 | 12/2008 | Muller et al. |
| 2008/0309451 | A1 | 12/2008 | Zellweger et al. |
| 2009/0075624 | A1 | 3/2009 | Cox et al. |
| 2009/0091437 | A1 | 4/2009 | Corniot |
| 2009/0096575 | A1 | 4/2009 | Tieman |
| 2009/0096576 | A1 | 4/2009 | Oman et al. |
| 2009/0096596 | A1 | 4/2009 | Sultan et al. |
| 2009/0098907 | A1 | 4/2009 | Huntzicker et al. |
| 2009/0167524 | A1 * | 7/2009 | Chesnutt et al. ......... 340/539.19 |
| 2009/0273438 | A1 | 11/2009 | Sultan et al. |
| 2010/0145759 | A1 | 6/2010 | Hembury |
| 2010/0168967 | A1 | 7/2010 | Dlugoss et al. |
| 2010/0233957 | A1 | 9/2010 | Dobosz |
| 2011/0015971 | A1 | 1/2011 | Hembury |
| 2011/0071720 | A1 | 3/2011 | Schondorf et al. |
| 2011/0071725 | A1 | 3/2011 | Kleve et al. |
| 2011/0071734 | A1 | 3/2011 | Van Wiemeersch et al. |
| 2011/0080282 | A1 | 4/2011 | Kleve et al. |
| 2011/0130945 | A1 | 6/2011 | Deedy et al. |
| 2011/0205040 | A1 | 8/2011 | Van Wiemeersch et al. |
| 2011/0205047 | A1 | 8/2011 | Patel et al. |
| 2011/0215901 | A1 | 9/2011 | Van Wiemeersch et al. |
| 2011/0230165 | A1 | 9/2011 | Kleve et al. |

OTHER PUBLICATIONS

Vehicle monitoring system, GPS vehicle monitoring system. Vehicle tracking system. http://www.guardmagic.com/, May 22, 2009.

Solindo GPS, Solindo Web Products: The Solutions Provider Company. Printout from www.solindoweb.com/products.php on Sep. 16, 2009, pp. 1-4.

J. Smith, Wanted:One Gorilla, printed from www.tirereview.com, Jul. 27, 2009.

Check Tire Pressure with Bluetooth, printed from www.esato.com, Jul. 30, 2004.

Chinese Office Action, PUS1 Family, Dated Mar. 4, 2013.

German Office Action, PUS1 Family, Dated Mar. 1, 2013.

* cited by examiner

METHOD AND SYSTEM FOR ENABLING AN AUTHORIZED VEHICLE DRIVEAWAY

BACKGROUND

1. Technical Field

The embodiments described herein generally relate to a method and system for enabling an authorized vehicle driveaway.

2. Background Art

In one conventional remote start system, a driver may toggle a switch on a key fob while positioned away from a vehicle to enable the vehicle to start. In this example, the key fob transmits (i.e., a one-way transmission) a long range radio frequency (RF) command signal (e.g., meters to miles) to a receiver positioned within a controller in the vehicle such that the controller validates the integrity of the RF signal prior to enabling the vehicle to start. The RF command may include various security aspects such as a rolling code protocol. After the RF command signal is validated, the vehicle may start. The driver may also toggle another switch on the key fob to unlock door(s) of the vehicle after the vehicle is started to gain entry into the vehicle.

To ensure that the authorized driver is now in the vehicle after the vehicle is started with the key fob, the driver may be required to insert a key into an ignition switch prior to the vehicle shifting from park to drive. When the key is inserted into the ignition switch and is manually rotated, an RF validation occurs between the controller in the vehicle and a transponder in the key. In this example, the controller may be positioned within 25-50 mm to the ignition switch and the RF validation between transponder on the key and the controller occurs over this short distance. By requiring the RF validation to occur over a short distance coupled with the rotation of the key ensures that the driver is authorized to drive the vehicle and serves as a mechanism to ensure that the driver is "tethered" (or anchored) to the vehicle. The tethering notion further serves to ensure that the driver is indeed authorized to start the vehicle.

In another conventional vehicle start system, a passive entry passive start (PEPS) operation may occur to start the engine of the vehicle. In the PEPS operation, the key fob (or smart fob) may be implemented as a 2-way device. Meaning, the smart fob may receive and transmit frequency based signals. For example, the smart fob and the controller may communicate via low frequency (LF) signals in the event the smart fob and the controller are detected to be in close proximity to one another (e.g., 1 to 3 meters). After the controller has confirmed that the smart fob is an authorized device, the controller may unlock the vehicle to enable the holder of the smart fob to gain entry into the vehicle. Once the driver is in the vehicle, another RF validation may occur between the smart fob and controller to initiate the process and allow the driver to start the vehicle. The driver may then press a brake pedal (assuming the smart fob is validated while in the vehicle) and a push button start switch to start the vehicle. In general, the validation that occurs over the short distance between the smart fob and the controller, coupled with the brake pedal operation, validates that the driver is indeed an authorized driver and is within the vehicle cabin and, more particularly, within the driver's seat. The PEPS operation serves as a mechanism that the driver is "tethered" to the vehicle. The tethering notion serves to ensure that the driver is indeed authorized to start the vehicle.

SUMMARY

One aspect may include a computer system having at least one server in communication (e.g., and without limitation, over a telecommunications network) with a nomadic device and a vehicle driveaway authorization system. The at least one server may be configured to generate a vehicle driveaway authorization code for authorizing a vehicle to drive and a user authorization code that corresponds to the vehicle driveaway authorization code.

The at least one server may be further configured to receive a vehicle driveaway request signal. The vehicle driveaway request signal may include, for example, a door unlock signal. In some embodiments, the vehicle driveaway request signal may be a user-issued command signal which may be transmitted from a nomadic device.

In response to a receipt of the vehicle driveaway request signal, the at least one server may be configured to transmit the vehicle driveaway authorization code to the vehicle driveaway authorization system and the user authorization code to the nomadic device. Further, the at least one server may be further configured to additionally transmit at least a portion of the vehicle driveaway request signal. In some embodiments, upon receipt of the vehicle driveaway request signal, the vehicle driveaway authorization system may be configured to transmit one or more signals to permit entry into the vehicle.

The user authorization code may be input to the vehicle driveaway authorization system and the vehicle driveaway authorization code may be compared to the user authorization code upon the user authorization code being input to the vehicle driveaway authorization system. If the vehicle driveaway authorization code corresponds to the user authorization code, the vehicle is authorized to be driven. In some embodiments, the vehicle driveaway authorization code and the user authorization code may be generated upon a receipt of the vehicle driveaway request signal.

The vehicle driveaway authorization code and the user authorization code may be selected from the group consisting of a numerical code, an alphanumeric code, one or more maneuvers in the vehicle, voice recognition, a graphical code, a color code, a question and answer combination, a fingerprint scan, or combinations thereof. Further, the user authorization code may be input using one or more of a vehicle keypad, a touch screen display, one or more radio button presses, one or more voice commands, a fingerprint scanner, vehicle brakes, one or more vehicle lights, a vehicle horn, or a combination thereof.

Another aspect may include a vehicle driveaway authorization method. The method may include generating one or more vehicle driveaway authorization codes for authorizing a vehicle drive and generating one or more user authorization codes that correspond to the one or more vehicle driveaway authorization codes. The method may also include receiving a vehicle driveaway request signal.

In response to receiving the vehicle driveaway request signal, one or more vehicle driveaway authorization codes may be transmitted to a vehicle driveaway authorization system and the one or more user authorization codes may be transmitted to a nomadic device for input to the vehicle driveaway authorization system. Accordingly, a vehicle drive may be enabled based on a comparison by the vehicle driveaway authorization system of the one or more user authorization codes and the one or more vehicle driveaway authorization codes and correspondence between the one or more user authorization codes and the one or more vehicle driveaway authorization codes.

The one or more vehicle driveaway authorization codes and the one or more user authorization codes may be randomly-generated. In some embodiments, at least two vehicle driveaway authorization codes and at least two user authorization codes may be generated. The at least two user authorization codes may include a (i) user-input user authorization code and (ii) a wireless signal (e.g., and without limitation, a BLUETOOTH signal, a WiFi signal, or a near field communication signal) including at least one of a rolling code or a fixed code.

In some embodiments, the authorization method may further include receiving a security level value for the authorization method. The complexity of the authorization method may correlate with the security level value. Furthermore, the security level value may establish a complexity of the vehicle driveaway authorization code and the user authorization code.

Another aspect may include a method including generating a driveaway authorization code and a user authorization code corresponding to the driveaway authorization code. Furthermore, a driveaway request signal may be received. Responsive to receiving the request signal, the driveaway authorization code may be transmitted to a driveaway authorization system and the user authorization code may be transmitted to a nomadic device for input to the authorization system. In some embodiments, the driveaway request signal may be also transmitted. A vehicle drive may thereby be enabled based on a comparison and correspondence of the driveaway authorization and the user authorization codes.

Another aspect may include a vehicle driveaway authorization system which may include at least one server that may be configured to generate a vehicle driveaway authorization code and a user authorization code. The at least one server may be further configured to transmit over a telecommunications network (1) the vehicle driveaway authorization code to at least one vehicle computer and (2) the user authorization code to a nomadic device.

The vehicle driveaway authorization system may further include at least one wireless nomadic device configured to receive the user authorization code.

The vehicle driveaway authorization system may additionally include at least one vehicle computer which may be configured to wirelessly receive the vehicle driveaway authorization code for authorizing a vehicle drive. The vehicle driveaway authorization code may correspond to the user authorization code. An input may be received at the vehicle defining the user authorization code. Further, an identifying signal may be wirelessly received to identify the wireless nomadic device in a vicinity of a vehicle.

Based on the identifying signal, it may be determined whether the wireless nomadic device was previously wirelessly paired with the vehicle.

The at least one vehicle computer of the vehicle driveaway authorization system may be further configured to compare the vehicle driveaway authorization code to the user authorization code. If the nomadic device was previously wirelessly paired with the vehicle and if the vehicle driveaway authorization code corresponds to the user authorization code, the at least one vehicle computer may be further configured to enable the vehicle to be driven.

Another aspect may include a vehicle driveaway authorization method. The authorization method may include generating a vehicle driveaway authorization code and a user authorization code. The vehicle driveaway authorization code may be transmitted over a telecommunications network to at least one vehicle computer and (2) the user authorization code may be transmitted over a telecommunications network to a nomadic device. The user authorization code may be received at the nomadic device.

The method may further include receiving the vehicle driveaway authorization code at a vehicle computer for authorizing a vehicle drive. The vehicle driveaway authorization code may correspond to the user authorization code.

Input to the vehicle computer may be received defining the user authorization code. Further, an identifying signal may be wirelessly received to identify the nomadic device in a vicinity of a vehicle.

A determination may be made whether the nomadic device was previously wirelessly paired with the vehicle based on the identifying signal. Further, the vehicle driveaway authorization code may be compared to the user authorization code.

If the nomadic device was previously wirelessly paired with the vehicle and if the vehicle driveaway authorization code corresponds to the user authorization code, the method may further include enabling the vehicle to be driven.

These and other aspects will be better understood in view of the attached drawings and following detailed description of the invention.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

DETAILED DESCRIPTION

Detailed embodiments of the invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

A cellular phone (or other suitable apparatus) may be used as a device to permit entry into a vehicle and/or remote start of the vehicle. When a driver uses only a nomadic device to start or enter a vehicle, some challenges may arise in order to authorize a drive away of the vehicle. For example, one non-limiting challenge is positively detecting a phone of an approved driver and validating that the driver is either in the vehicle driver seat or in the vehicle's cabin. Another non-limiting example is verifying that the phone is in the cabin and preventing someone already in the cabin from being able to drive the vehicle away if a person with a valid matched phone outside the cabin starts the vehicle but has not yet arrived to the running vehicle.

Various embodiments described herein may, among other things, validate that the holder of a cell phone or other suitable device is authorized to start the vehicle and that such a holder is in the cabin of the vehicle and is authorized to drive the vehicle. It is contemplated that the embodiments described herein may be utilized for purposes other than those described and that challenges or problems noted herein are not intended to be an exhaustive list of problems that may be overcome by the embodiments of the present invention. Such challenges or problems as noted herein are noted for illustrative purposes and that all of the challenges or problems that may be overcome by the various embodiments of the present invention are not described for purposes of brevity.

Figure 1:
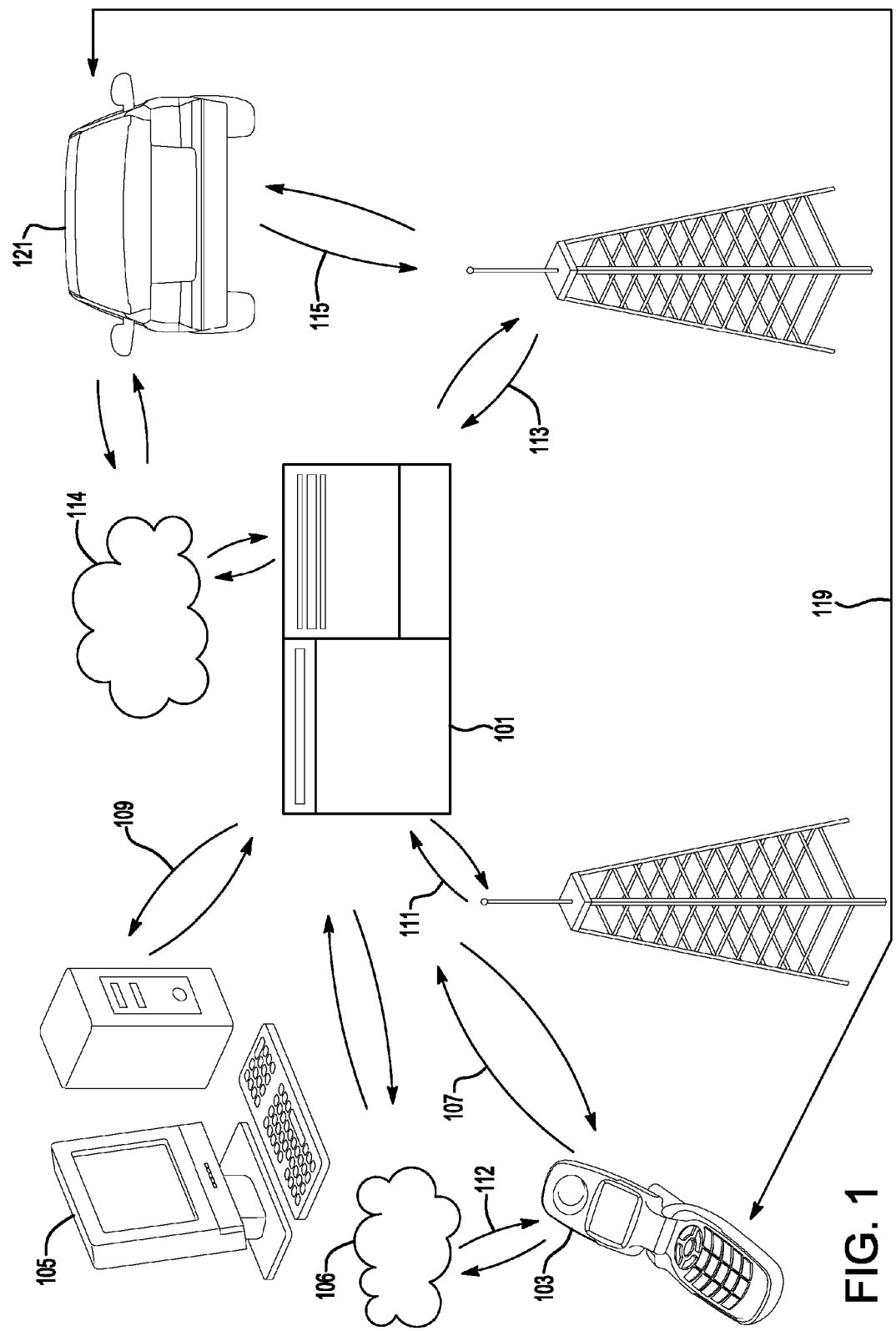
FIG. 1 shows an illustrative example of a communication system through which a nomadic device can communicate with a vehicle according to one of the various embodiments.

FIG. 1 shows an illustrative example of a communication system through which a nomadic device can communicate with a vehicle 121. In this illustrative embodiment, a nomadic device (e.g., without limitation, a cellular phone) 103 is used to send a communication through a cellular network 107. This communication is relayed through a network 111 (e.g., without limitation, the cellular network, the internet, etc.) to a centralized system 101. In another embodiment, the nomadic device 103 may send a communication through network 112 which may include, but is not limited to, WiFi or WiMax. This communication is relayed through a network 106 (e.g., without limitation, the internet,) to a centralized system 101.

In this illustrative embodiment, the centralized system is a server system that includes processing capability for incoming nomadic device signals designated to interact with a remote vehicle 121.

For example, the server(s) 101 may include an automated call server and/or web host. Further, the server(s) 101 may route an incoming signal from a nomadic device (ND) 103 to the appropriate remote vehicle. Data sent in this fashion may be sent using data-over-voice, a data-plan, or in any other suitable format.

Data can also be sent to the remote vehicle 121 through the server(s) 101 using a personal computer 105. In this case, the data is likely, although not necessarily, sent over the internet 109.

Once the server(s) 101 receive the incoming data request from the remote source 103, 105, the message is processed and/or relayed to a vehicle 121. The vehicle may be identified by a header associated with one or more incoming data packets, or may be identifiable based on a database lookup, for example.

In one embodiment, a message is relayed to the remote source 103, 105 as well. For example, as will be described in further detail below, when an authorized user remotely transmits a request from a nomadic device 103 (e.g., via a button or key press) to receive authorization to operate and drive away the vehicle 121, the server(s) 101 may respond by transmitting an authorization code to both the nomadic device 103 and to the vehicle 121 for input by the authorized user at the vehicle 121. An authorized user may be any individual recognized by the vehicle 121 as an authorized user based on a fingerprint scan, an authorized code, voice recognition, and the like. It should be understood that these examples are non-limiting and other means of authorization may be used.

The relay to the vehicle 121 is sent out from the server(s) 101 through a network (e.g., without limitation, a cellular network 113, the internet, etc.) and passed through a cellular network 115 to the vehicle 121. In another embodiment, the relay may be passed through network 114 (e.g., WiFi or WiMax) and to the vehicle 121. A remote communication module 200 in the vehicle 121 receives the signal sent from the server(s) 101 and processes it or relays it to an appropriate processing system within the vehicle 121.

In at least one illustrative embodiment, the vehicle 121 is also outfitted with a communication transceiver, such as, but not limited to, a BLUETOOTH transceiver. This transceiver may allow communication with the nomadic device 103 using a direct signal 119.

It should be understood that the communication between nomadic device 103, server 101, and vehicle 121 may be performed in a number of ways and FIG. 1 is presented for illustrative purposes. FIG. 1 illustrates various alternatives for communicating data. For example, and without limitation, data communication may be partially or entirely cellular or WiFi, or a combination of cellular and WiFi.

FIGS. 2a-d show illustrative examples of vehicle-based communication modules that provide communication to a remote network.

Figure 2A:
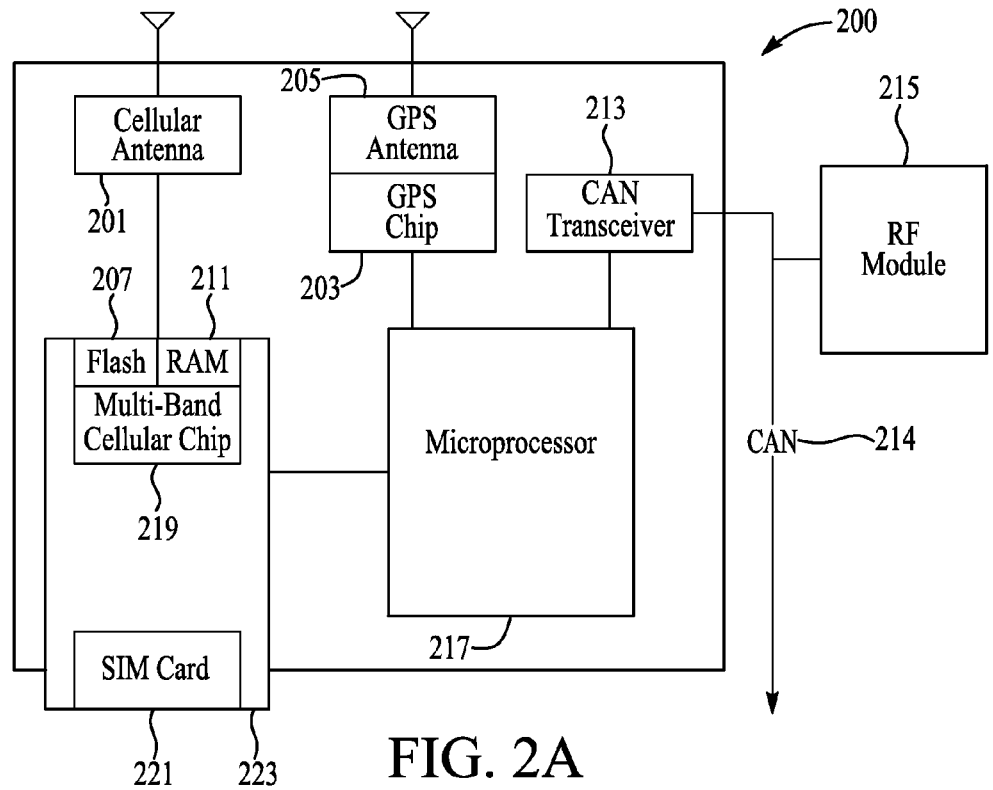
FIGS. 2a-d show illustrative examples of vehicle-based communication devices that provide communication to a remote network according to one of the various embodiments.

FIG. 2a shows an illustrative example of a communication module 200 combined with a GPS module, wherein a cellular module and GPS are on different boards.

In this illustrative embodiment, a communications module 200 can include a cellular (e.g., and without limitation, GSM or CDMA) antenna 201 that communicates with a remote server over a cellular network. The received cellular signal may be sent from the cellular antenna 201 to a multi-band cellular (e.g., and without limitation, GSM or CDMA) decoder 219 that processes the received signal to produce information usable by the microprocessor 217.

In this illustrative embodiment, the multi-band cellular chip 219, including flash memory 207 and RAM 211, is installed in the module as part of a removable device 223 including a SIM card 221. The SIM card 221 may contain user identifying information that allows access to the cellular network under a particular user's plan.

Additionally, the module includes a GPS chip 203 that can process and decode a signal from the GPS antenna 205 and send this information to a microprocessor 217.

The microprocessor is also in communication with a vehicle data bus that provides access to various vehicle modules, such as RF module 215. Other modules not shown include, but are not limited to, the vehicle cluster, a remote (off-board) GPS system, a radio module, etc. Non-limiting examples of a vehicle data bus include an SAE J1850 bus, a CAN bus, a GMLAN bus, and any other vehicle data buses known in the art. For illustration purposes only, FIGS. 2a-2d are represented as using a CAN bus.

Figure 2B:
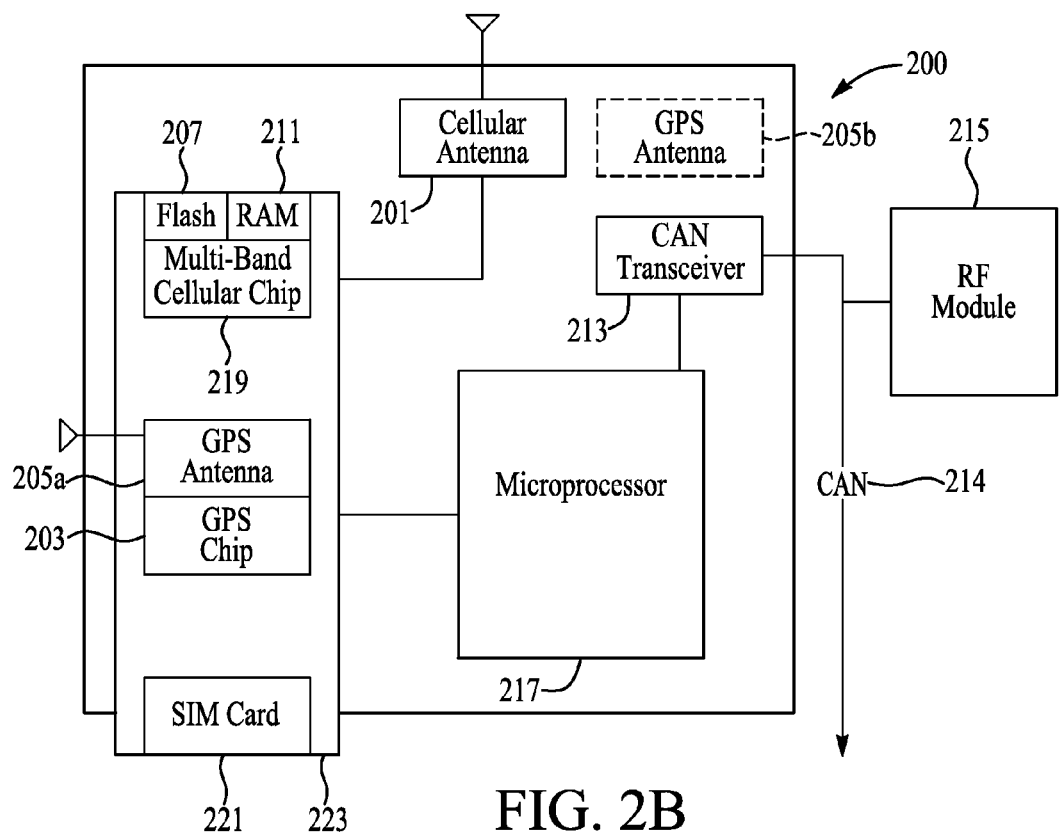

FIG. 2b shows a second exemplary embodiment in which a cellular chip and GPS are on the same board 223. In this illustrative embodiment, the removable board (this board may also be permanently attached to the module) 223 may contain the SIM card 221, a GPS module including a GPS chip 203 and a GPS antenna 205a, and the Multi-band cellular chip 219 including flash memory 207 and RAM 211.

In another embodiment, the GPS antenna 205b may be attached to the module separately from this board 223. When a signal comes in from the cellular antenna 201 and/or the GPS antenna 205b, the signal may be sent to the corresponding cellular/GPS chip 203 for processing, and then passed to the microprocessor 217. The microprocessor 217 interfaces with the CAN transceiver 213 to connect to a vehicle network 214 and vehicle modules such as RF module 215.

Figure 2C:
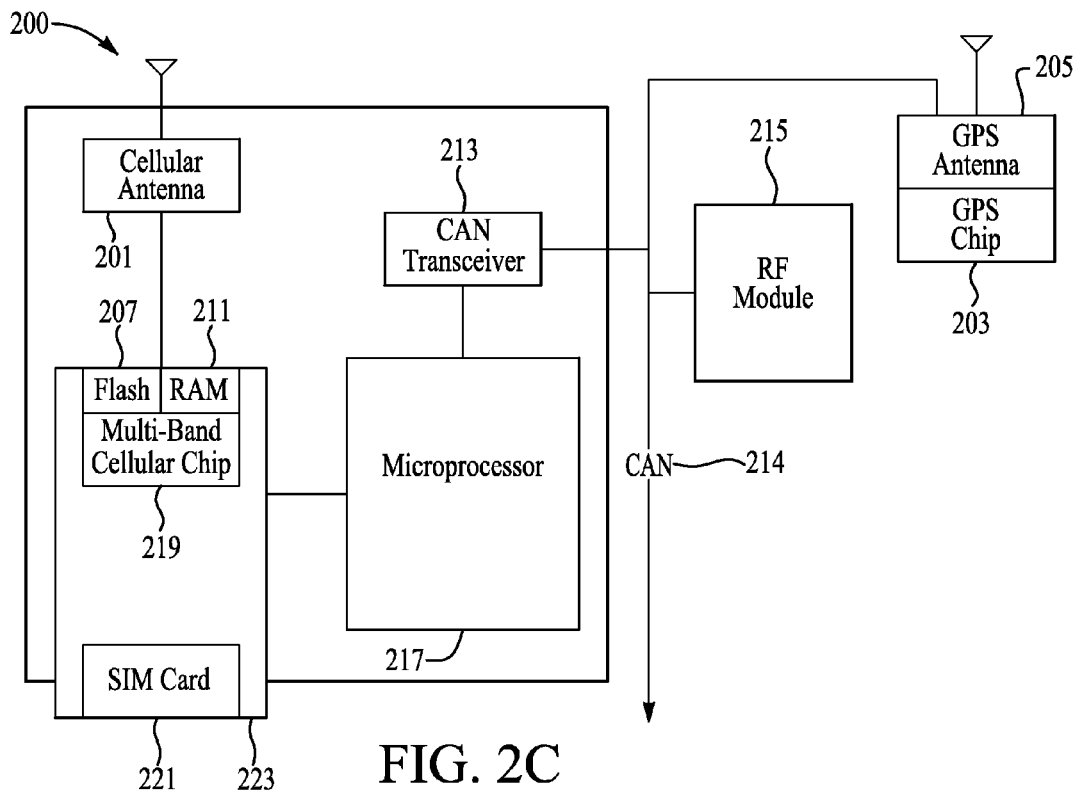

FIG. 2c shows yet another exemplary embodiment in which the cellular module is standalone. In this illustrative embodiment, the GPS module containing the GPS antenna 205 and the GPS chip 203 may connect to the microprocessor 217 through the CAN transceiver 213. Other vehicle modules, such as an RF module 215 can also connect to the microprocessor through the CAN transceiver 213.

In this illustrative embodiment, the removable board 223 may contain a SIM card 221 and a multi-band cellular chip 219, as well as a flash memory 207 and RAM 211. Signals from the cellular antenna 201 may be sent to the board 223 for processing by the multi-band cellular chip 219 before being sent to the microprocessor 217.

Figure 2D:
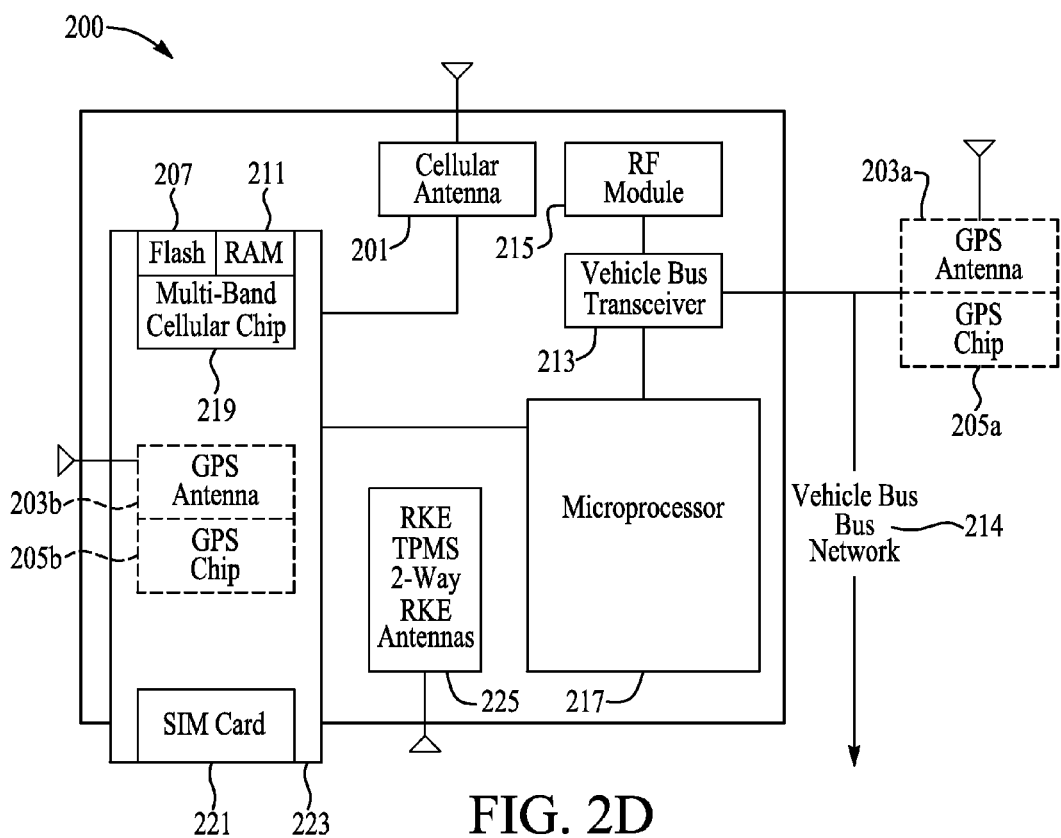

FIG. 2d shows still another exemplary embodiment in which a cellular module is combined with an RF module 215 in the communications module 200. The RF module 215 may continue to talk to the microprocessor 217 through the CAN transceiver 213. In this illustrative embodiment, the GPS module, including the GPS antenna 203a, 203b and GPS chip 205a, 205b can be located within the communications module 200 or located elsewhere in the vehicle, in which case it may communicate with the microprocessor 217 through the CAN transceiver 213.

Again, in this embodiment, the cellular antenna 201 may send a signal to the multi-band cellular 219, including flash memory 207 and RAM 211. The signal may be processed and sent to the microprocessor 217. The multi band cellular chip 219 may be located on a removable circuit board 223, which may also include a SIM card 221.

Figure 3:
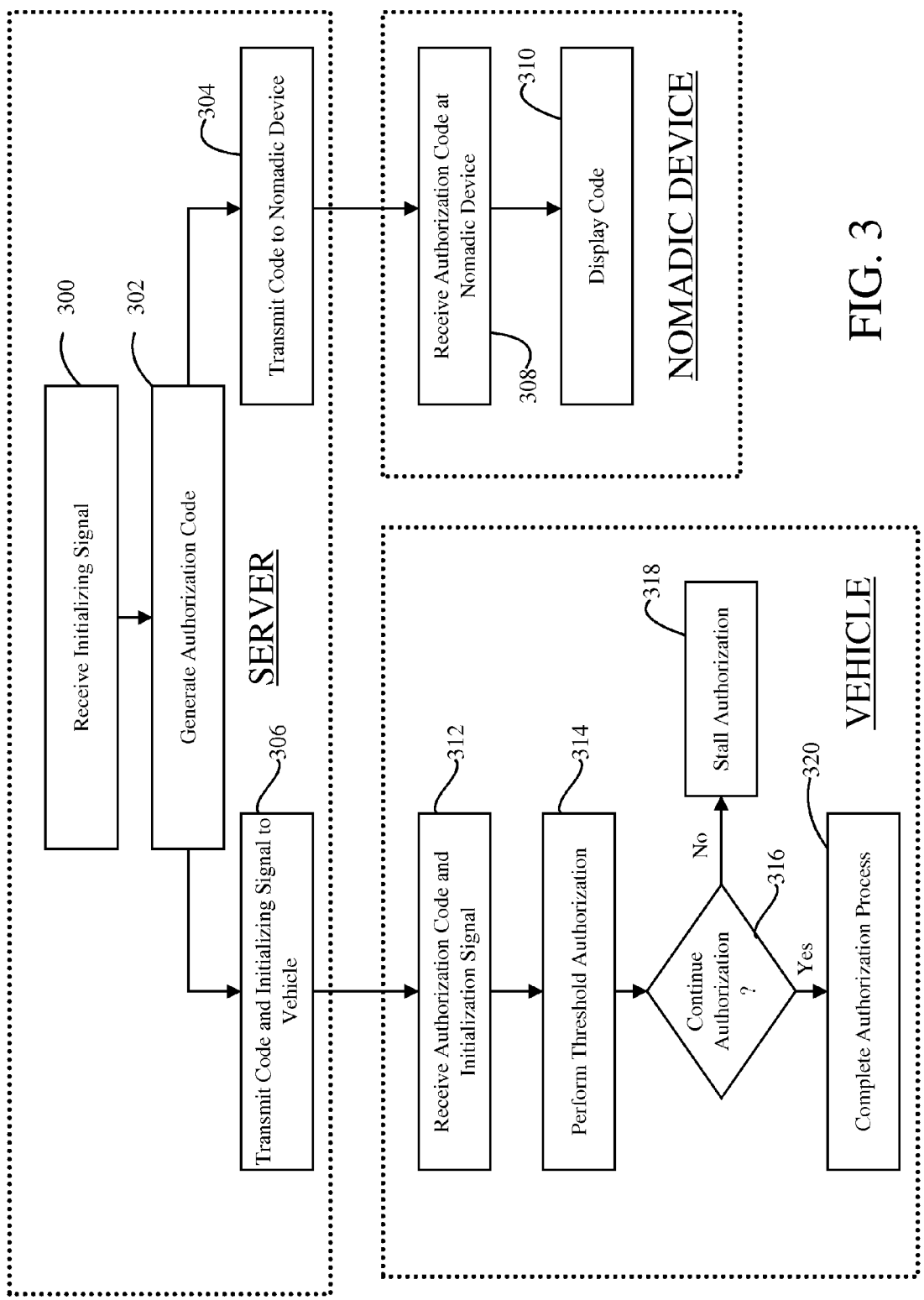
FIG. 3 illustrates a vehicle operation/driveaway authorization process according to one of the various embodiments.

FIG. 3 illustrates an exemplary authorization process for authorizing the entry and operation (i.e., drive away) of a vehicle. The server(s) 101 may receive an initializing command as illustrated in block 300. The initializing command may identify to the server 101 and/or vehicle 121 that a request to authorize drive away of the vehicle is being made by a user from the authorized nomadic device 103.

In one embodiment, the initializing command may operate to "wake up" the server(s) 101 and/or the communication module 200. The "wake up" signal may indicate that an entry and drive authorization is requested.

The initializing command may be a signal sent to the server 101 in response to a user input. User input may include, but is not limited to, a button press, a voice command, a touch-screen selection, or a finger-print scan. The user may input the initializing command by selecting, for example (and without limitation), an "unlock & drive" option from a selectable menu option or reciting a predetermined or user-defined word such "authorize" or "unlock and drive." In one embodiment, the ND 103 may be equipped with a shortkey or "hot button" for initializing the authorization system.

In one embodiment, biometrics may be utilized for initializing the authorization process and/or performing the authorization process (as described below). For example, the user may scan a fingerprint (e.g., at the ND 103) and, if a match is found, the scan may serve as an initializing command. The counterpart matching fingerprint scan may be stored on the ND 103 or on the server 101 for transmission to the vehicle. When the user input scan and the stored scan are compared and a match is found (e.g., by performing the comparison at the server 101), instructions that identify the presence of the match may be transmitted for initializing the authorization process and/or enabling operation or drive of the vehicle. In one embodiment, the initialization command process and/or the authorization process may include a bypass option for bypassing the input of a biometric identifier. For example, the user may input a bypass code at the vehicle 121, ND 103 and/or PC 105.

The biometric code may be stored in the vehicle authorization system's memory and the comparison may be performed entirely at the vehicle 121. As such, the initializing command may be activated and/or the authorization process may be performed (as described below) entirely at the vehicle 121. The biometric code may be stored in memory after vehicle acquisition such as at the point of sale. For example, a vehicle dealer may provide a vehicle owner with an administrator password and website access (e.g., www.syncmyride.com) for uploading a biometric identifier or code. The vehicle owner (or any other person authorized to operate the vehicle) may then upload a biometric identifier (e.g., a fingerprint scan or retinal scan) to the vehicle 121 using a biometric scanner (not shown) in the vehicle 121 or at PC 105. If PC 105 is used, the biometric data may be downloaded to the vehicle 121 using, for example, an internet connection.

It should be understood that the arrangement of FIG. 3 is non-limiting and certain aspects may be added, deleted and/or combined. For example, and without limitation, the method may be performed without the presence of a nomadic device (e.g., entirely at the vehicle 121) or may be performed using a personal computer (PC). Furthermore, while certain steps are illustrated as being performed at the server, vehicle, or nomadic device, the arrangement is illustrative and presented as such for clarity purposes.

One or more data packets may be transmitted from the ND 103 for transmitting the request. Non-limiting examples of data (i.e., information) transmitted in the data packets may include a mobile identification number (MIN), a customer identification number, the one or more commands triggered from the ND 103, and the vehicle identification number (VIN).

The server(s) 101 may process the data packets for generating the authorization code. Processing the data packet(s) may include, but is not limited to, authenticating the one or more commands, authenticating the user (e.g., determining if the user is a registered user) and authenticating the cellular/mobile phone (e.g., matching the MIN to the VIN). Authentication may be accomplished using one or more look-up tables. Accordingly, server(s) 101 may communicate with one or more databases (not shown) having user authentication information.

As illustrated in block 302, an authorization code may be generated, e.g., by server(s) 101. In one embodiment, the authorization codes may be dynamically generated random codes. Server(s) 101 may include software for generating the dynamic codes.

The server(s) 101 may generate at least two codes that may be identical copies of each other and/or pieces of a code that are paired to form the authorization code. One or more codes (or first part of a code) may be transmitted to the nomadic device 103, as illustrated in block 304, and one or more second codes (or second part of the code) may be transmitted to the vehicle as illustrated in block 306. Non-limiting examples of codes may be numbers, colors, icons, pictures, a question and answer combination, or a series of user maneuvers (e.g., and without limitation, horn honk and brake press combination). The codes may be encrypted. In one embodiment, the codes may utilize a public/private key encryption system. Furthermore, these codes may be randomly generated.

The server(s) 101 may generate the codes based on user personal preferences. The preferences may be set using a configuration tool, for example, software downloaded from a website such as www.syncmyride.com. The user may set personal preferences during configuration of the authorization software and configure the preferences from a PC, nomadic device, or the vehicle.

A non-limiting example of a preference may be the use of a fingerprint scan or retinal scan for authorization. This biometric data may be stored in server(s) 101 and/or vehicle 121 as described above. Another non-limiting preference may include a security level for obtaining authorization. For instance, the user may set the security level at "LOW,"

"MEDIUM" or "HIGH" or assign the security level a numeric value such as 1, 2 or 3 (e.g., 1 is a low level of security while 3 is a high level of security).

The security level for obtaining authorization may determine the complexity level of the authorization code such that the higher the security level, the greater the complexity of the authorization code. For instance, if the security level is set to "LOW," the authorization code may comprise only 2 digits to be input at the vehicle. If the security level is set to "MEDIUM," the authorization code may comprise 3 or 4 digits to be input at the vehicle. If the security level is set to "HIGH," two codes may be required to be input: (1) the 3-4 digit user code and (2) an additional code generated by the server(s) 101 and/or a biometric scan (such as a fingerprint or retinal scan). For example, this additional code may be a 12 digit encrypted server-generated rolling code transmitted from the ND 103 to a vehicle authorization system via a wireless connection (e.g., and without limitation, BLUETOOTH or WiFi). Alternatively, the 12 digit code may not be a rolling code. For example, and without limitation, the code may be a fixed code or other suitable code. Thus, authorization to operate and/or drive the vehicle may be given if the user authorization code input by the user and the vehicle driveaway authorization code correspond and the 12 digit code is received and recognized by the vehicle authorization system.

In one embodiment, the 12-digit encrypted server-generated code may be used as an additional level of authorization regardless of the security level. Along with the user authorization code, the 12-digit encrypted code may be sent to the nomadic device 103 for performing the authorization process at the vehicle.

Figure 4:
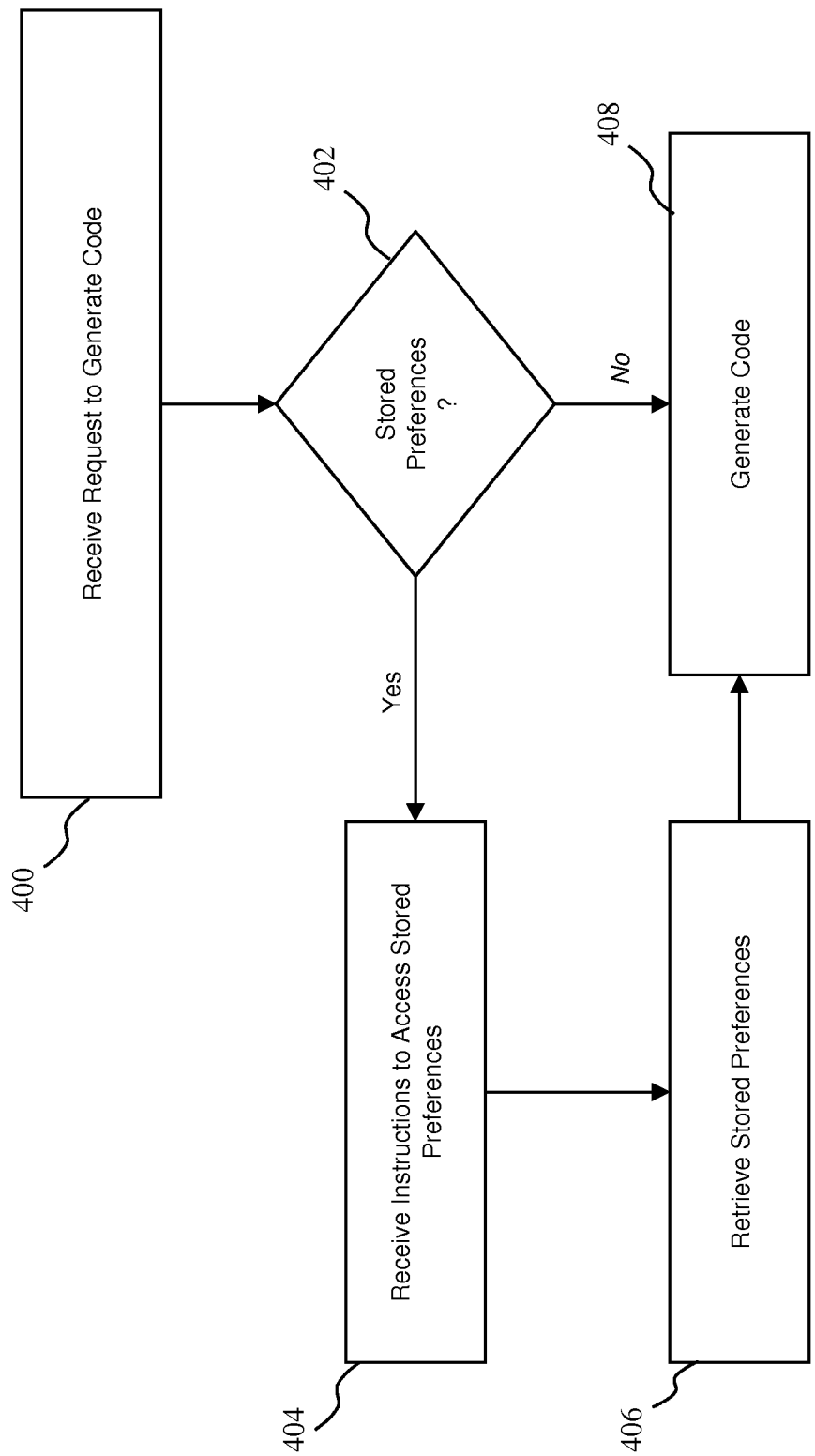
FIG. 4 illustrates a code generation operation according to one of the various embodiments.

FIG. 4 illustrates one exemplary operation of generating a code based on user preferences stored at server(s) 101. Upon receiving the initializing command (block 300 of FIG. 3), a request signal to generate one or more codes may be transmitted to code generation software as illustrated in block 400. A determination may be made whether there are any stored preferences as illustrated in block 402. If not, any random code may be generated as illustrated in block 408. In one embodiment, the random code may be generated based on a default security level.

If personal preferences are stored, stored preferences may be accessed, as illustrated in block 404, and retrieved, as illustrated in block 406. The code may be configured according to the personal preferences (e.g., using a configuration algorithm) and the customized code may be generated as illustrated in block 408.

Referring back to FIG. 3, in one embodiment, the server(s) 101 may transmit the initialization command and the randomly generated code(s) together to the vehicle as illustrated in block 306. In this embodiment, upon receiving the initialization command from the user (as illustrated in block 300), the server may temporarily store or queue the initialization signal in memory until a code is generated. Upon generation of the code, the initialization command signal may be released and transmitted with the random code. It should be understood that other methods of transmitting the initialization command may be utilized without departing from the scope of the invention.

As illustrated in block 308, the code(s) (or part of a code) may be received at the nomadic device 103. The code(s) may be displayed to the user as illustrated in block 310. In one embodiment, the user may be alerted to the presence of the code(s), for example, as a text message sent to the nomadic device 103. In a further non-limiting embodiment, the code(s) may be sent to the nomadic device 103 as a digital file. In yet another non-limiting embodiment, the code(s) may be received as an e-mail.

At about the same time, the random code(s) and the initialization command signal may also be received and stored in memory at the vehicle as illustrated in block 312. The vehicle operation/driveaway authorization process at the vehicle may commence according to blocks 314, 316, 318, and 320.

Upon receiving the initialization command from the user, a threshold authorization determination may be performed as illustrated in block 314. Prior to receiving, or while the vehicle authorization system is awaiting receipt of, the user-input authorization code(s), the vehicle authorization system may "wake up" and search for the presence of an authorized nomadic device 103 upon receipt of the initialization command. Non-limiting examples of authorized nomadic device(s) 103 may include those that are or have been paired to the vehicle computing system or those having a recognized RFID tag. An authorized nomadic device 103 may be detected by, for example (and without limitation), a paired connection between the vehicle authorization system and the nomadic device 103 or an RFID tag scanner (not shown) in the vehicle scanning for and recognizing the nomadic device 103 based on the RFID tag.

A further determination may be made whether further authorization steps should be performed as illustrated in block 316. If nomadic device 103 is not recognized, the vehicle 121 will stall further authorization as illustrated in block 318. In one embodiment, the vehicle may permit entry into the vehicle, but further operation of the vehicle will be stalled. For example (and without limitation), the vehicle may not start, the gear shift (whether automatic or manual) may be locked, or the steering wheel maybe locked. 12 volt charging may remain operational to charge a nomadic device with a low battery.

Figure 5:
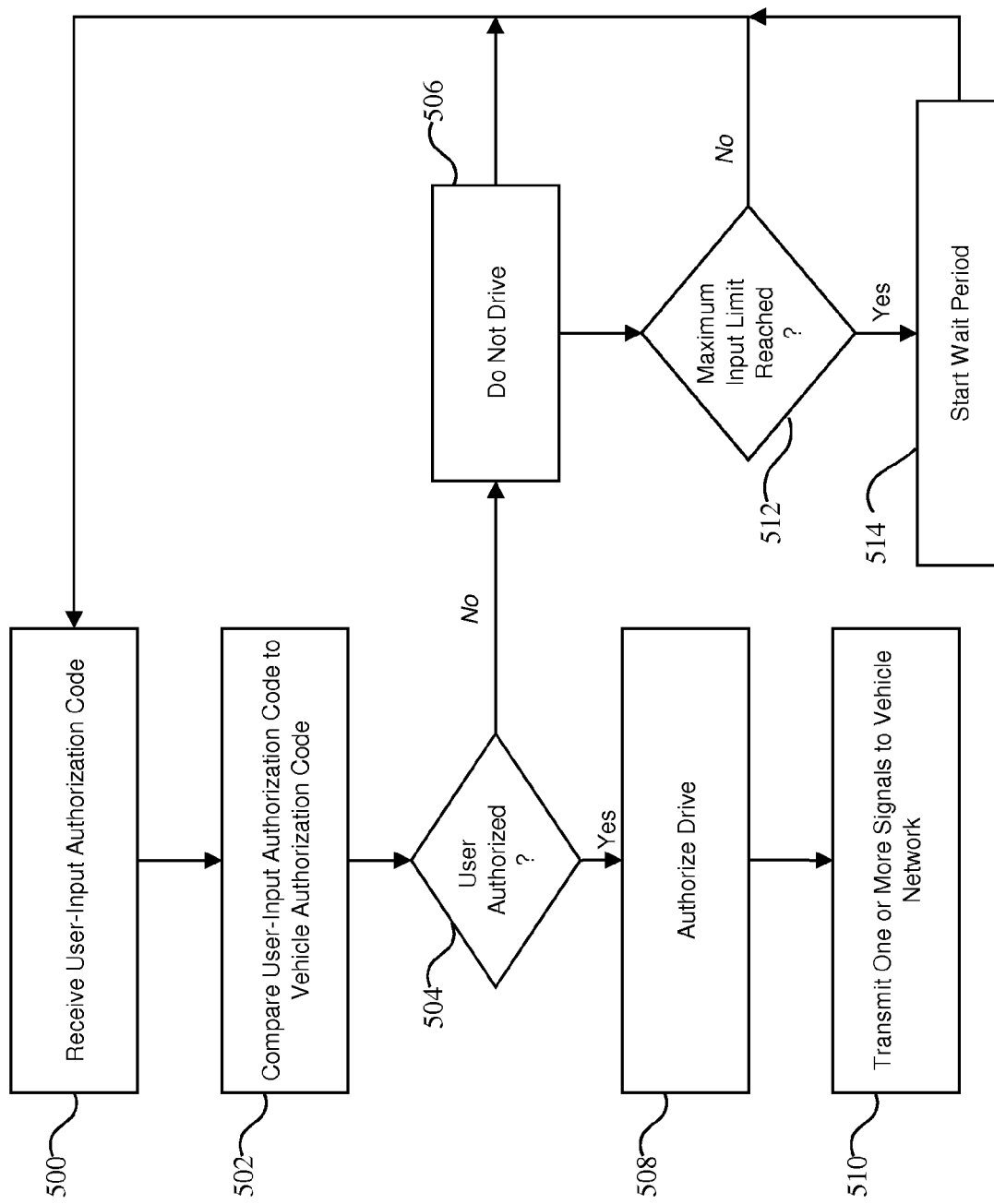
FIG. 5 illustrates a vehicle operation/driveaway authorization process according to another one of the various embodiments of the present invention.

If the nomadic device 103 is recognized, additional steps may be necessary for authorizing operation and/or driveaway of the vehicle as illustrated in block 320. Further details of the authorization process will be described with respect to FIG. 5.

In one embodiment, the user may request authorization from PC 105. In this embodiment, the request (and the initializing signal) may be transmitted from the PC 105 and the request may be made from a website or software in a similar fashion as described above.

When the nomadic device 103 is recognized, the authorization process may then proceed to confirming that the user is authorized. User authorization may be accomplished based on a comparison of the authorization code(s) received at the vehicle 121 and input by the user at the vehicle 121.

In the vehicle, the authorization code(s) may be entered as illustrated in block 500. The code(s) may or may not be entered by a user. The code(s) may be input using a keyboard (e.g., located in the center stack of the vehicle), using a touch screen display, using voice-activated commands, transmitting a signal with the code via a local wireless connection (e.g., and without limitation, BLUETOOTH), and/or using a fingerprint or retinal scanner. The entered code(s) may then be compared by the vehicle authorization system with the code(s) stored at the vehicle 121 to determine if the user is authorized as illustrated in block 502.

For example, authorization to operate the vehicle may be given if the user seeking vehicle operation and/or driveaway authorization enters the numbers "1," "2" and "3" at the vehicle corresponding to the "1-2-3" code stored in the vehicle. As another example, authorization is given to operate the vehicle if the user honks twice and pushes the brake once corresponding to the same two honks, one brake push pattern stored at the vehicle. As yet another example, authorization is given if the retinal scan performed at the vehicle corresponds to the retinal scan stored at the vehicle 121 (as described above). These non-limiting examples may or may not include the additional recognition by the vehicle of a 12-digit encrypted code (rolling, fixed, etc.) transmitted from the nomadic device 103.

In another example, the codes may be functions of each other. For example, and without limitation, the user authorization code may be a function of the vehicle driveaway authorization code. In this non-limiting embodiment, the vehicle may store the corresponding function (which matches the code input by the user as the user authorization code) in memory and compare the user authorization code with the stored function upon a user input of the user authorization code.

Based on the code(s) that is input, a determination may be made whether the user is authorized to drive the vehicle as illustrated in block 504. If the user is not authorized (i.e, the code(s) is incorrect or has not been entered), authorization to drive the vehicle is not given and, accordingly, operation may be stalled as illustrated in block 506.

In one embodiment, the vehicle authorization system may lockout a user or generate a "wait" period before the authorization code may be reentered if the authorization code is input incorrectly a predetermined number of times (e.g., three) as illustrated in block 512. As such, the user may not be able to re-enter the code until a predetermined amount of time has lapsed (e.g., two minutes) as illustrated in block 514. In yet a further embodiment, if the threshold level has been exceeded (i.e., the code has been input more than three times), an emergency contact person may be contacted (e.g., via a cellular call made to the vehicle owner or another emergency contact) in order to deter a potential theft of the vehicle. The user may customize the threshold level during and after configuration of the authorization system.

If the user is authorized (i.e., the correct code is entered), operation of the vehicle may be authorized as illustrated in block 508. Once authorized, one or more signals may be transmitted to one or more components of the vehicle via the vehicle network 214 as illustrated in block 510. The user may then drive the vehicle.

While exemplary embodiments are illustrated and described above, it is not intended that these embodiments illustrate and describe all possibilities. Rather, the words used in the specification are words of description rather than limitation, and it is understood that various changes may be made without departing from the spirit and scope of the invention.

What is claimed:

1. A vehicle driveaway authorization system comprising:
at least one server configured to:
generate a vehicle driveaway authorization code and a user authorization code; and
transmit over a telecommunications network (1) the vehicle driveaway authorization code to at least one vehicle computer and (2) the user authorization code to a nomadic device;
at least one wireless nomadic device configured to receive the user authorization code; and
at least one vehicle computer configured to:
wirelessly receive the vehicle driveaway authorization code for authorizing a vehicle drive, the vehicle driveaway authorization code corresponding to the user authorization code;
receive input at the vehicle defining the user authorization code;
wirelessly receive an identifying signal to identify the wireless nomadic device in a vicinity of a vehicle;
determine whether the wireless nomadic device was previously wirelessly paired with the vehicle based on the identifying signal;
compare the vehicle driveaway authorization code to the user authorization code; and
enable the vehicle to be driven based on a determination that the nomadic device was previously wirelessly paired with the vehicle and if the vehicle driveaway authorization code corresponds to the user authorization code.

2. A vehicle driveaway authorization method comprising:
generating a vehicle driveaway authorization code and a user authorization code;
transmitting over a telecommunications network (1) the vehicle driveaway authorization code to at least one vehicle computer and (2) the user authorization code to a nomadic device;
receiving the user authorization code at a nomadic device;
receiving the vehicle driveaway authorization code at a vehicle computer for authorizing a vehicle drive, the vehicle driveaway authorization code corresponding to the user authorization code;
receiving input to the vehicle computer defining the user authorization code;
wirelessly receiving an identifying signal to identify the nomadic device in a vicinity of a vehicle;
determining whether the nomadic device was previously wirelessly paired with the vehicle based on the identifying signal;
comparing the vehicle driveaway authorization code to the user authorization code; and enabling the vehicle to be driven based on a determination that the nomadic device was previously wirelessly paired with the vehicle and if the vehicle driveaway authorization code corresponds to the user authorization code.

* * * * *